United States Patent
Nakamura et al.

(10) Patent No.: US 12,115,901 B2
(45) Date of Patent: Oct. 15, 2024

(54) APPARATUS AND METHOD FOR IDENTIFYING VEHICLE STATE, APPARATUS AND METHOD FOR CONTROLLING OPTICAL AXIS OF VEHICLE LAMP, VEHICLE LAMP SYSTEM

(71) Applicant: Stanley Electric Co., Ltd., Tokyo (JP)

(72) Inventors: Shigekatsu Nakamura, Tokyo (JP); Riku Takahashi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/562,856

(22) PCT Filed: May 16, 2022

(86) PCT No.: PCT/JP2022/020406
§ 371 (c)(1),
(2) Date: Nov. 21, 2023

(87) PCT Pub. No.: WO2022/244737
PCT Pub. Date: Nov. 24, 2022

(65) Prior Publication Data
US 2024/0270154 A1 Aug. 15, 2024

(30) Foreign Application Priority Data

May 21, 2021 (JP) .................................. 2021-086433

(51) Int. Cl.
*B60Q 1/08* (2006.01)

(52) U.S. Cl.
CPC ........ *B60Q 1/085* (2013.01); *B60Q 2300/114* (2013.01); *B60Q 2300/132* (2013.01); *B60Q 2300/136* (2013.01)

(58) Field of Classification Search
CPC ........ B60Q 2300/114; B60Q 2300/132; B60Q 2300/136; B60Q 1/085
See application file for complete search history.

(56) References Cited

U.S. PATENT DOCUMENTS

| | | | |
|---|---|---|---|
| 9,238,431 B2 * | 1/2016 | Kasaba | B60Q 1/10 |
| 10,471,885 B2 * | 11/2019 | Ohsawa | B60Q 1/115 |

(Continued)

FOREIGN PATENT DOCUMENTS

| | | |
|---|---|---|
| JP | H11-257981 A | 9/1999 |
| JP | 2012-173143 A | 9/2012 |
| JP | 2019-043471 A | 3/2019 |

OTHER PUBLICATIONS

International Search Report and Written Opinion mailed on Jul. 12, 2022, received for PCT Application PCT/JP2022/020406, filed on May 16, 2022, 10 pages including English Translation.

*Primary Examiner* — Arman B Fallahkhair
(74) *Attorney, Agent, or Firm* — XSENSUS LLP

(57) ABSTRACT

To accurately identify a vehicle state. An apparatus identifies a vehicle state and includes a controller connected with an angular velocity sensor and an acceleration sensor, where the controller acquires acceleration per unit time along a vehicle's longitudinal direction axis from the acceleration sensor, determines acceleration variation over a certain period of time, acquires angular velocity per unit time around vehicle's roll axis from the angular velocity sensor, determines the angular velocity variation during the certain period of time, and identifies the vehicle as a first state when the acceleration variation is greater than a first threshold value and the angular velocity variation is greater than a second threshold value, and identifies the vehicle as a second state when the acceleration variation is less than the first (Continued)

threshold value and the angular velocity variation is less than the second threshold value, and outputs the identified result.

10 Claims, 7 Drawing Sheets

(56) References Cited

U.S. PATENT DOCUMENTS

| | | | | |
|---|---|---|---|---|
| 11,560,152 B2* | 1/2023 | Yu | ........................ | B60W 40/072 |
| 11,934,734 B2* | 3/2024 | Kim | ........................ | G06F 3/1438 |
| 2021/0255211 A1* | 8/2021 | Szilágyi | ............... | G01C 21/185 |
| 2022/0099267 A1* | 3/2022 | Ishikawa | ................ | B60Q 1/115 |

* cited by examiner

FIG. 4

| EVENT | STOPPING (STABLE) | LOAD LUGGAGE JUST BEFORE DECELERATION IS COMPLETED (UNSTABLE) | GRADUALLY START ACCELERATION/ DECELERATION | ACCELERATING/ DECELERATING | AT CONSTANT SPEED |
|---|---|---|---|---|---|
| | (2), (3) | (1), (7) | (3) | (4) | (5) |
| X-AXIS ACCELERATION | NO CHANGE CLOSE TO 0 dps | CHANGES | GRADUALLY CHANGES | DRASTICALLY CHANGES | NO CHANGE VALUE OF BEGINNING OF RUNNING |
| ROLL ANGULAR VELOCITY | NO CHANGE CLOSE TO 0 dps | CHANGES | ALMOST NO CHANGE CLOSE TO 0 dps | CHANGES | NO CHANGE CLOSE TO 0 dps |

APPARATUS AND METHOD FOR IDENTIFYING VEHICLE STATE, APPARATUS AND METHOD FOR CONTROLLING OPTICAL AXIS OF VEHICLE LAMP, VEHICLE LAMP SYSTEM

CROSS-REFERENCE TO RELATED APPLICATIONS

The present application is based on PCT filing PCT/JP2022/020406, filed May 16, 2022, which claims priority from Japanese Patent Application No. 2021-086433, filed May 21, 2021, the entire contents of each are incorporated herein by reference.

TECHNICAL FIELD

The present disclosure relates to an apparatus and a method for identifying vehicle state, an apparatus and a method for controlling optical axis of a vehicle lamp, and a vehicle lamp system.

BACKGROUND ART

Japanese Patent Application Laid-Open No. 2008-032591 (Patent Document 1) discloses a technique for detecting the start of running or stopping of a vehicle using a gyro sensor. Further, Japanese Patent Application Laid-Open No. 2018-062185 (Patent Document 2) discloses a technique for determining the usage state of a vehicle (start of running, parking) using an acceleration sensor. Further, Japanese Patent No. 4968841 (Patent Document 3) discloses a technique that controls the optical axis of a headlight to be adjusted only when the opening/closing state of an opening/closing member such as a door is in the "open state".

PRIOR ART DOCUMENT

Patent Document

Patent Document 1: Japanese Patent Application Laid-Open No. 2008-032591
Patent Document 2: Japanese Patent Application Laid-Open No. 2018-062185
Patent Document 3: Japanese Patent No. 4968841

SUMMARY OF THE INVENTION

Technical Problem

In a specific aspect, it is an object of the present disclosure to identify a vehicle state with higher accuracy. In a specific aspect, it is an object of the present disclosure to perform optical axis control according to the vehicle state.

Solution to the Problem (1) An apparatus according to one aspect of the present disclosure is (a) an apparatus that identifies a state of a vehicle including a controller connected to an angular velocity sensor and an acceleration sensor, (b) where the controller (b1) acquires acceleration per unit time along an axis corresponding to a longitudinal direction of the vehicle from the acceleration sensor, determines an amount of change of the acceleration over a certain period of time, (b2) acquires angular velocity per unit time around either a roll axis or a pitch axis of the vehicle from the angular velocity sensor, determines an amount of change of the angular velocity during the certain period of time, and (b3) identifies the vehicle as being in a first state when the amount of change of the acceleration is greater than or equal to a first threshold value and the amount of change of the angular velocity is greater than a second threshold value, and identifies the vehicle as being in a second state which is different from the first state when the amount of change of the acceleration is less than the first threshold value and the amount of change of the angular velocity is less than or equal to the second threshold value, and outputs the identified result.

(2) An apparatus according to one aspect of the present disclosure is (a) an apparatus that identifies a state of a vehicle including a controller connected to an angular velocity sensor and an acceleration sensor, (b) where the controller (b1) acquires an acceleration per unit time along an axis corresponding to a longitudinal direction of the vehicle from the acceleration sensor, determines a first difference which is the difference between a current value and a previous value of the acceleration, (b2) acquires an angular velocity per unit time around either the roll axis or the pitch axis of the vehicle from the angular velocity sensor, determines a second difference which is the difference between a current value and a previous value of a sinusoidal vector of the roll axis or the pitch axis based on the angular velocity, and (b3) identifies the vehicle as being in a first state when a state monitoring parameter obtained based on a ratio of the first difference and the second difference is equal to or greater than a predetermined threshold, and identifies the vehicle as being in a second state which is different from the first state when the state monitoring parameter is less than the predetermined threshold, and outputs the identified result.

(3) A method according to one aspect of the present disclosure is (a) a method that identifies a state of a vehicle performed by a controller connected to an angular velocity sensor and an acceleration sensor, where the method includes (b) to acquire an acceleration per unit time along an axis corresponding to a longitudinal direction of the vehicle from the acceleration sensor, determines an amount of change of the acceleration over a certain period of time, (c) to acquire an angular velocity per the unit time in either a roll axis or a pitch axis of the vehicle from the angular velocity sensor, determines an amount of change of the angular velocity during the certain period of time and (d) to identify the vehicle as being in a first state when the amount of change of the acceleration is greater than or equal to a first threshold value and the amount of change of the angular velocity is greater than a second threshold value, and identifies the vehicle as being in a second state which is different from the first state when the amount of change of the acceleration is less than the first threshold value and the amount of change of the angular velocity is less than or equal to the second threshold value, and outputs the identified result.

(4) A method according to one aspect of the present disclosure is (a) a method that identifies a state of a vehicle performed by a controller connected to an angular velocity sensor and an acceleration sensor, where the method includes (b) to acquire an acceleration per unit time along an axis corresponding to a longitudinal direction of the vehicle from the acceleration sensor, determines a first difference which is the difference between the current value and the previous value of the acceleration, (c) to acquire an angular velocity per unit time around either the roll axis or the pitch axis of the vehicle from the angular velocity sensor, determines a second difference which is the difference between the current value and the previous value of a sinusoidal vector of the roll axis or the pitch axis based on the angular velocity, and (d) to identify the vehicle as being in a first state when a state monitoring parameter obtained based on a ratio of the first difference and the second difference is equal to or greater than a predetermined threshold, and to identify the vehicle as being in a second state which is different from the first state when the state monitoring parameter is less than the predetermined threshold, and outputs the identified result.

(5) An apparatus according to one aspect of the present disclosure is (a) an apparatus that controls an optical axis of a headlamp installed in a vehicle, (b) where a first process is selected when the identified result of the vehicle state obtained by the above-described apparatus that identifies the state of the vehicle is the first state, a second process which is different from the first process is selected when the identified result is the second state, determines an attitude angle of the vehicle, and outputs a control signal for controlling the optical axis of the headlamp using the attitude angle.

(6) A method according to one aspect of the present disclosure is (a) a method to control an optical axis of a headlamp installed in a vehicle, (b) where a first process is selected when the identified result of the vehicle state obtained by the above-described method that identifies the state of a vehicle is the first state, a second process which is different from the first process is selected when the identified result is the second state, determines an attitude angle of the vehicle, and outputs a control signal for controlling the optical axis of the headlamp using the attitude angle.

(7) A system according to one aspect of the present disclosure is a vehicle lamp system including (a) the above-described apparatus that controls the optical axis and (b) a headlamp whose optical axis can be variably set based on the control signal output from the apparatus that controls the optical axis.

According to the above configurations, it is possible to identify a vehicle state with higher accuracy. Further, according to the above configurations, it is possible to perform optical axis control in accordance with the identified vehicle state.

BRIEF DESCRIPTION OF THE DRAWINGS

FIG. 4 is a diagram showing a table summarizing the relationship between characteristics of changes in X-axis acceleration and roll angular velocity and vehicle state.

MODE FOR CARRYING OUT THE INVENTION

First Embodiment

Figure 1:
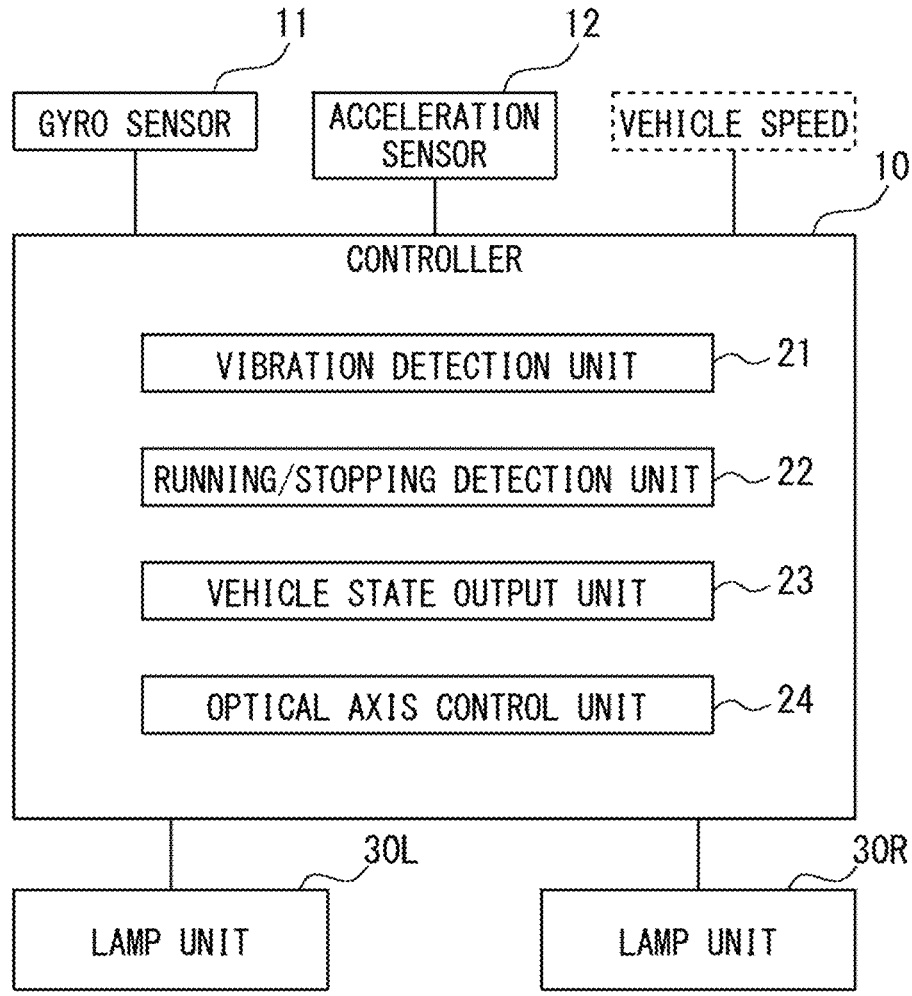
FIG. 1 is a diagram showing the configuration of a vehicle lamp system according to one embodiment.

FIG. 1 is a diagram showing the configuration of a vehicle lamp system according to the first embodiment. This vehicle lamp system irradiates light by variably setting the optical axis according to the attitude of the own vehicle, and is configured to include a controller 10, a gyro sensor 11, an acceleration sensor 12, and a pair of lamp units 30L and 30R.

The controller 10 controls the operation of the vehicle lamp system, and is configured using a computer capable of executing a predetermined operation program, for example.

Here, for the purpose of ease of understanding, functions realized by the controller 10 will be explained using functional blocks. The controller 10 includes a vibration detection unit 21, a running/stopping detection unit 22, a vehicle state output unit 23, and an optical axis control unit 24. Further, a signal or data indicating the speed of the vehicle is input to the controller 10. The vehicle speed is detected by a sensor (not shown) installed in the vehicle, and is obtained in the form of a vehicle speed pulse signal or vehicle speed data, for example.

Here, the "apparatus for identifying vehicle state" according to the present disclosure is configured to include the vibration detection unit 21, the running/stopping detection unit 22, and the vehicle state output unit 23 of the controller 10, and the "method for identifying vehicle state" is executed. Further, the "apparatus for controlling optical axis" according to the present disclosure is configured to include the vibration detection unit 21, the running/stopping detection unit 22, the vehicle state output unit 23, and the optical axis control unit 24 of the controller 10, and the "method for controlling optical axis" is executed.

The gyro sensor 11 is a sensor (angular velocity sensor) that detects angular velocity and outputs data or signals according to its magnitude. The gyro sensor 11 of the present embodiment only needs to be able to detect an angular velocity corresponding to at least either the roll angle or the pitch angle of the vehicle. For example, it is assumed that the gyro sensor 11 of the present embodiment is capable of detecting angular velocities corresponding to each of the roll angle and the pitch angle. The gyro sensor 11 is installed at a predetermined position in the vehicle (for example, in the back side of the glove box).

The acceleration sensor 12 is a sensor that detects acceleration and outputs data or signals according to its magnitude. The acceleration sensor 12 of the present embodiment is capable of detecting acceleration corresponding to at least the longitudinal (front-rear) direction and the vertical direction of the vehicle. Here, note that each axis of the acceleration sensor 12 does not necessarily have to completely coincide with each of the longitudinal (front-rear) direction and the vertical directions of the vehicle, and in that case, correction processing may be performed on the detected values as appropriate.

The vibration detection unit 21 detects vibration of the vehicle based on data (or signals; the same applies hereinafter) output from the gyro sensor 11 or the acceleration sensor 12, and outputs data (or signals; the same applies hereinafter) according to the magnitude of the vibration. Specifically, the vibration detection unit 21 generates and outputs data corresponding to any of "running", "stopping (stable)", and "Undetermined". "Undetermined" here refers to a state corresponding to either "running" or "stopping (unstable)."

When data corresponding to "Undetermined" is generated from the vibration detection unit 21, by further using the obtained parameters based on data output from each of the gyro sensor 11 and the acceleration sensor 12, according to the parameters, the running/stopping detection unit 22 generates data (or signals; the same applies hereinafter) which corresponds to "running" or data which corresponds to "stopping (unstable)".

The vehicle state output unit 23 determines the vehicle state based on the data of each detection result of the vibration detection unit 21 and the running/stopped detection unit 22, and provides data (or a signal; the same applies hereinafter) indicating the vehicle state to the optical axis control unit 24. In the present embodiment, as the vehicle state, the vehicle state output unit 23 uses at least one of the following three states, "running", "stopping (stable)", or "stopping (unstable)".

The optical axis control unit 24 determines the attitude angle of the vehicle (the angle between the road surface and the front-rear axis of the vehicle) based on the acceleration detected by the acceleration sensor 12, generates a control signal for controlling the optical axis of the irradiation light of each lamp unit 30L, 30R according to the attitude angle, and provides (outputs) the control signal to each lamp unit 30L, 30R. At this time, the optical axis control unit 24 appropriately selects a calculation method according to the vehicle state output from the vehicle state output unit 23, and calculates the attitude angle of the vehicle by applying the selected calculation method. Specifically, different calculation methods are used when the vehicle state is "running" and when the vehicle state is "stopping (stable)." A known method can be used as the calculation method for each. Further, when the vehicle state is "stopping (unstable)", the process of determining the attitude angle is temporarily suspended, and the optical axis control is stopped.

The headlights 30L and 30R are provided one each on the left and right sides of the front of the vehicle, and are used to irradiate light to the front of the vehicle. Various known lamp units can be employed as each of the lamp units 30L and 30R. For example, a lamp unit having a light source unit which is configured to include a light source, a reflector, etc., and an actuator that adjusts the direction of the light source up and down in order to adjust the optical axis (main traveling direction) of the light emitted from the light source, whose light irradiation range can be mechanically controlled can be used. Further, for example, a lamp unit with a configuration in which the light irradiation range can be controlled by combining a light source and a liquid crystal element, or a lamp unit with a configuration in which the light irradiation range can be controlled by selectively turning on/off multiple LEDs, or a lamp unit configured to control the light irradiation range by scanning the light from the laser element with a movable reflector and turning the laser element on and off at high speed can also be used.

Figure 2:
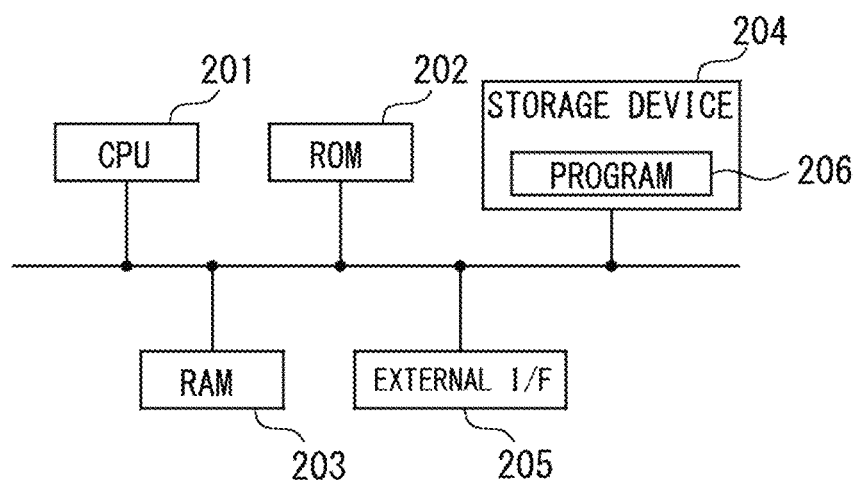
FIG. 2 is a diagram illustrating a configuration example of a computer that implements a controller of a vehicle lamp system.

FIG. 2 is a diagram illustrating a configuration example of a computer that implements the controller of a vehicle lamp system. The illustrated computer is configured to include a CPU (Central Processing Unit) 201, a ROM (Read Only Memory) 202, a RAM (Random Access Memory) 203, a storage device 204, and an external interface (I/F) 205 that are connected to each other so as to be able to communicate with each other. The CPU 201 operates based on a basic control program read from the ROM 202, and realizes the functions of the controller 10 described above by reading and executing a program (application program) 206 stored in the storage device 204. The RAM 203 temporarily stores data used when the CPU 201 operates. The storage device 204 is a nonvolatile storage device such as a hard disk or a solid state drive, and stores various data such as the program 206. The external interface 205 is an interface that connects the CPU 201 and external devices.

Figure 3:
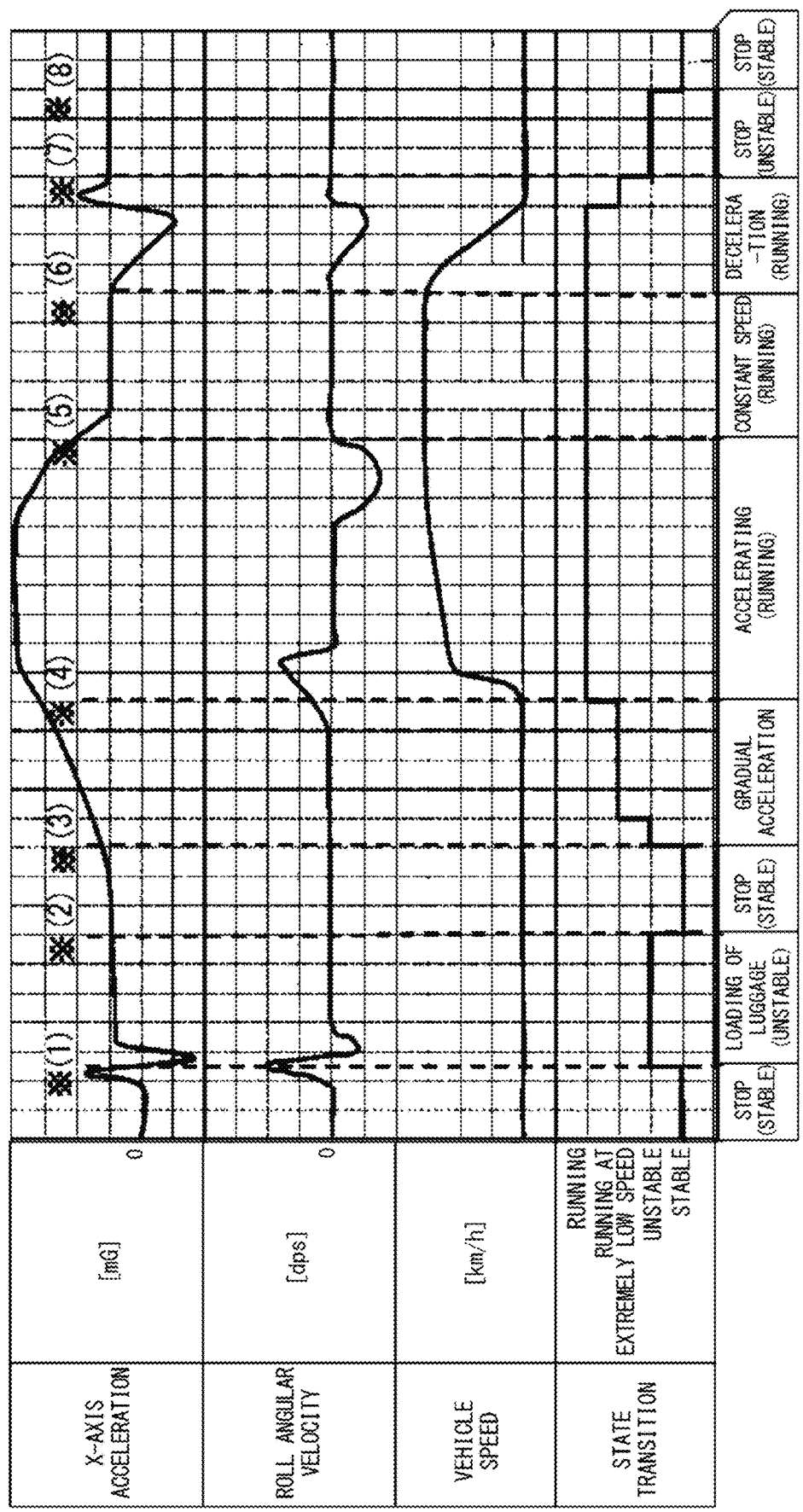
FIG. 3 is a diagram showing an example of a state transition of a vehicle and accompanying changes in acceleration, roll angular velocity, and vehicle speed.

FIG. 3 is a diagram showing an example of a state transition of the vehicle and accompanying changes in acceleration, roll angular velocity, and vehicle speed. FIG. 4 is a diagram showing a table summarizing the relationship between characteristics of changes in X-axis acceleration and roll angular velocity and vehicle state. Here, the X-axis acceleration is the acceleration of an axis (hereinafter referred to as "X-axis") corresponding to the longitudinal (front-rear) direction of the vehicle. The roll angular velocity is an angular velocity corresponding to the roll angle (rotation angle around the X-axis) of the vehicle. In the present embodiment, the vehicle state is identified using the characteristics of changes in the X-axis acceleration and roll angular velocity as shown here.

Specifically, when a cargo is loaded, the X-axis acceleration shows a change, and the roll angular velocity also shows a change (event (1) in the figure). The vehicle state at this point corresponds to "stop (unstable)". Further, when the vehicle is in a "stable stop" state, both the X-axis acceleration and the roll angular velocity do not change substantially (event (2) in the figure).

When acceleration (or deceleration) starts little by little (gradual acceleration), the X-axis acceleration changes little by little, but the roll angular velocity remains almost unchanged and remains around 0 dps (event (3) in the figure). Further, during acceleration, the X-axis acceleration changes significantly and the roll angular velocity also changes (event (4) in the figure).

When running at a constant speed, the X-axis acceleration does not change, and for example, maintains the value obtained at the beginning of running, and the roll angular velocity remains almost unchanged and is around 0 dps (event (5) in the figure). The vehicle state at this time corresponds to "running (accelerating)". Further, during deceleration, the X-axis acceleration changes significantly and the roll angular velocity also changes (event (6) in the figure). The vehicle state at this time corresponds to "running (deceleration)".

Further, just before the deceleration is completed, the X-axis acceleration shows a change, and the roll angular velocity also shows a change (event (7) in the figure). The vehicle state at this time corresponds to "stop (unstable)". Further, when deceleration is completed and the vibration of the vehicle has calmed down, both the X-axis acceleration and the roll angular velocity do not change substantially (event (8) in the figure). The vehicle state at this time corresponds to a "stable stop".

Figure 5:
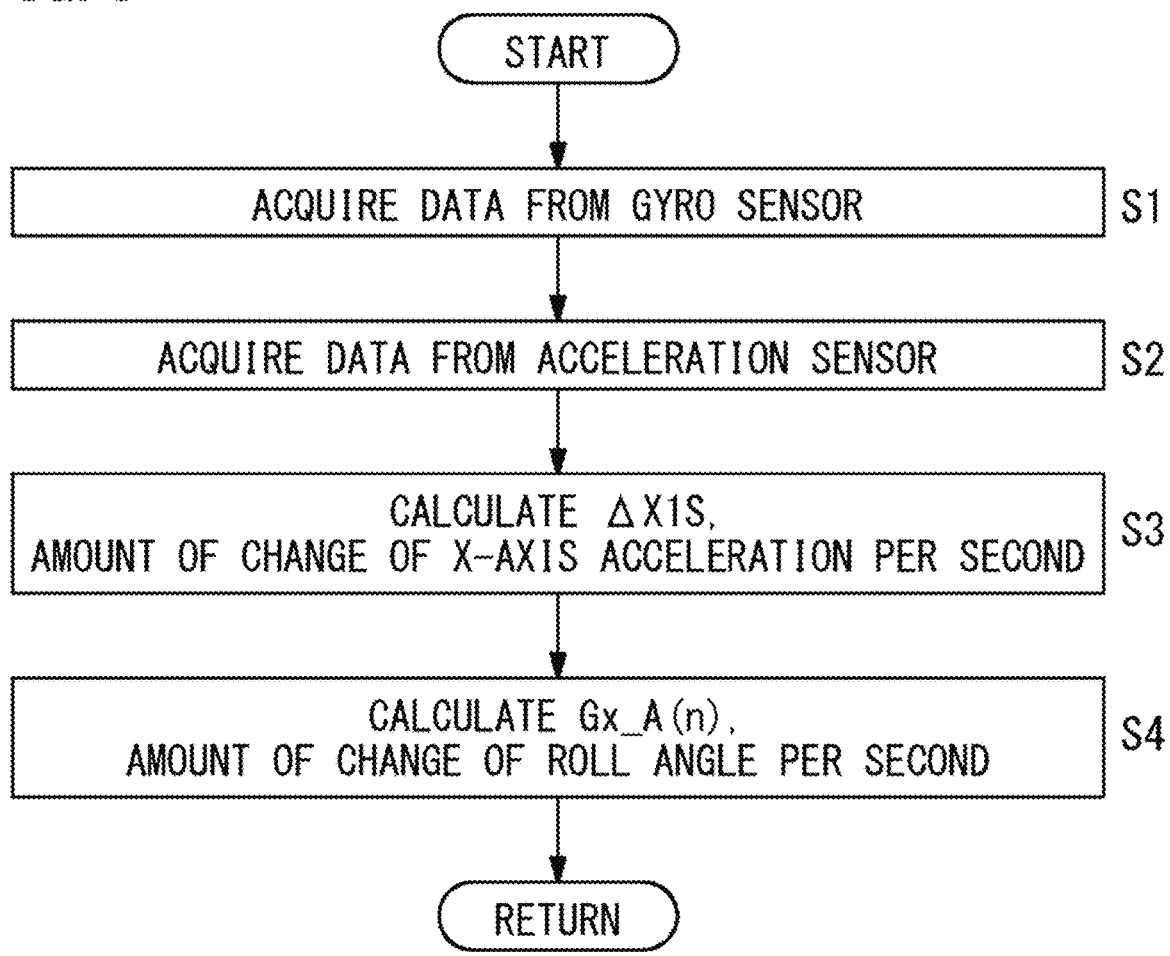
FIG. 5 is a flowchart illustrating a processing procedure for generating parameters used to identify a vehicle state based on data output from each of a gyro sensor and an acceleration sensor.

FIG. 5 is a flowchart illustrating a processing procedure for generating parameters used to identify the vehicle state based on data output from each of the gyro sensor and the acceleration sensor. These processes are repeatedly executed by the running/stopping detection unit 22 of the controller 10. Here, in any operation procedure, it is possible to change the processing order as appropriate as long as it does not cause contradiction or inconsistency in the results of information processing, and other processing not described here may be added, and such embodiments are also not excluded.

Specifically, the running/stopping detection unit 22 acquires roll angular velocity data from the gyro sensor 11 (step S1), and acquires X-axis acceleration data from the acceleration sensor 12 (step S2). For example, in the present embodiment, roll angular velocity data and X-axis acceleration data are each acquired every 100 ms.

Using each acquired data, the running/stopping detection unit 22 calculates the amount of change of the X-axis acceleration per second, expressed as $\Delta X_{1s}$ (step S3). The amount of change of the X-axis acceleration per second $\Delta X_{1s}$ can be obtained by using the X-axis acceleration obtained every 100 ms, calculating the X-axis acceleration at a certain time $X(n)$ and the X-axis acceleration at the previous time $X(n-1)$, and then integrating the difference $X(n)-X(n-1)$ over a period corresponding to, for example, one second. Specifically, it is expressed by the following formula.

$$\Delta X_{1s} = \Sigma X(n) - X(n-1)$$

Further, the running/stopping detection unit 22 calculates the amount of change of the roll angle per second, expressed as $Gx\_A(n)$ (step S4). The amount of change of roll angle per second $Gx\_A(n)$ is calculated by using the roll angular velocity obtained every 100 ms, calculating the roll angular velocity $\theta gx(n)$ at a certain time and the roll angular velocity value at the previous time $\theta gx(n-1)$, and then integrating the difference $\theta gx(n)-\theta gx(n-1)$ for over a period corresponding to, for example, one second. Specifically, it is expressed by the following formula.

$$Gx\_A(n) = \Sigma \theta gx(n) - \theta gx(n-1)$$

Each parameter ($\Delta X_{1s}$ and $Gx\_A(n)$) obtained as described above can be used to identify the vehicle state as described below.

Figure 6:
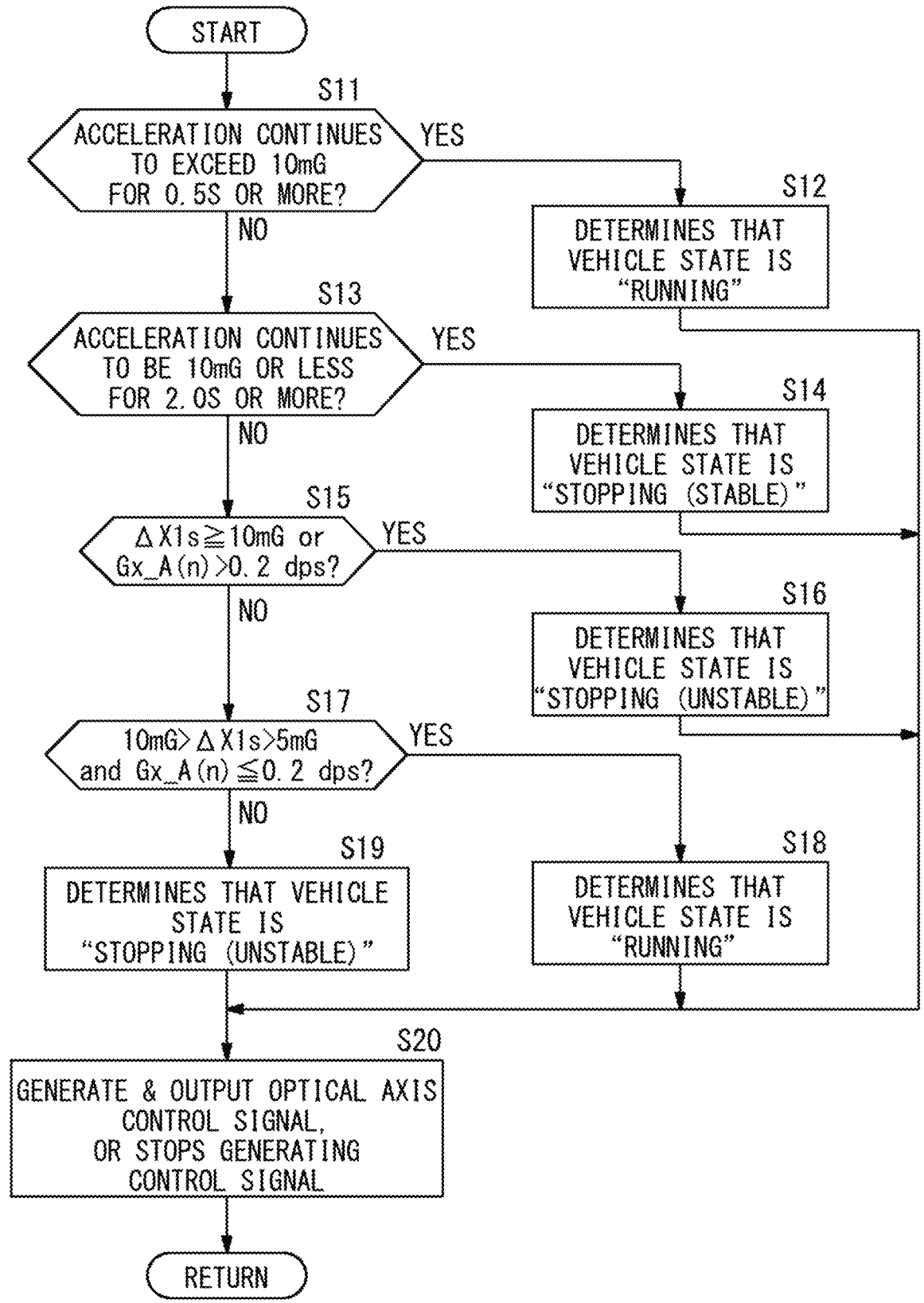
FIG. 6 is a flowchart illustrating a processing procedure for identifying the vehicle state by the controller and controlling the optical axis using it.

FIG. 6 is a flowchart illustrating the processing procedure for identifying the vehicle state by the controller and controlling the optical axis using it. The processing procedure shown here is repeatedly executed, for example, every 100 ms. Here, in any operation procedure, it is possible to change the processing order as appropriate as long as it does not cause contradiction or inconsistency in the results of information processing, and other processing not described here may be added, and such embodiments are also not excluded.

When the X-axis acceleration detected by the acceleration sensor 12 continues to exceed 10 mG for 0.5 seconds or more (step S11; YES), the vibration detection unit 21 of the controller 10 generates data which corresponds to "running". In this case, the vehicle state output unit 23 determines that the vehicle state is "running" and outputs data indicating the state to the optical axis control unit 24 (step S12). Here, note that for the vibration detection in this step, the roll angular velocity may be used instead of the X-axis acceleration, or both may be used.

On the other hand, in a case where the X-axis acceleration does not continue to exceed 10 mG for 0.5 seconds or more (step S11; NO), when the X acceleration continues to be 10 mG or less for 2.0 seconds or more (step S13; YES), the vibration detection unit 21 of the controller 10 generates data corresponding to "stopping (stable)". In this case, the vehicle state output unit 23 determines that the vehicle state is "stopping (stable)" and outputs data indicating this state to the optical axis control unit 24 (step S14).

Further, when the X-axis acceleration does not continue to be 10 mG or less for 2.0 seconds or more (step S13; NO), the vibration detection unit 21 of the controller 10 generates data corresponding to "Undetermined". The term "Undetermined" here refers to a state corresponding to either "running" or "stopping (unstable)".

In this case, for each of the above-described parameters, when $\Delta X_{1s} \geq 10$ mG or $Gx\_A(n) > 0.2$ dps (step S15; YES), the running/stopping detection unit 22 generates data corresponding to "stopping (unstable)". In this case, the vehicle state output unit 23 determines that the vehicle state is "stopping(unstable)" and outputs data indicating this state to the optical axis control unit 24 (step S16).

Further, for each of the above-described parameters, in a case where $\Delta X_{1s} < 10$ mG or $Gx\_A(n) \leq 0.2$ dps (step S15; NO), when 10 mG$>\Delta X_{1s}>5$ mG and $Gx\_A(n) \leq 0.2$ dps, the running/stopping detection unit 22 generates data corresponding to "running" (step S17; YES). In this case, the vehicle state output unit 23 determines that the vehicle state is "running" and outputs data indicating this state to the optical axis control unit 24 (step S18).

Here, note that when either the condition of 10 mG$>\Delta X_{1s}>5$ mG or the condition of $Gx\_A(n) \leq 0.1$ dps is not satisfied (step S17; NO), the running/stopping detection unit 22 generates data corresponding to "stopping (unstable)". In this case, the vehicle state output unit 23 determines that the vehicle state is "stopping (unstable)" and outputs data indicating this state to the optical axis control unit 24 (step S19).

When the vehicle state is output from the vehicle state output unit 23, the optical axis control unit 24 determines the attitude angle of the vehicle, generates a control signal for controlling the optical axis of the irradiation light of each lamp unit 30L, 30R according to this attitude angle, and outputs the control signal to each lamp unit 30L, 30R, or stops outputting the control signal (step S20).

Note that in the embodiment described above, the roll angle may be replaced with a pitch angle. Here, the pitch angle is the rotation angle of the vehicle around the left-right axis. Specifically, first, the process in step S4 of FIG. 5 described above is replaced with calculation of the amount of change of the pitch angle per second, expressed as $Gy\_A(n)$. The amount of change of the pitch angle per second $Gy\_A(n)$ can be obtained by using the pitch angular velocity obtained every 100 ms, calculating the pitch angular velocity $\theta gy(n)$ at a certain time and the pitch angular velocity $\theta gy(n-1)$ at the previous time, and then integrating the difference $\theta gy(n)-\theta gy(n-1)$ over a period corresponding to, for example, one second. Specifically, it is expressed by the following formula.

$$Gy\_A(n) = \Sigma \theta gy(n) - \theta gy(n-1)$$

Further, in steps S15 and S17 of FIG. 6, the part where $Gx\_A(n)$ is used is replaced with $Gy\_A(n)$. Specifically, in step S15, when $\Delta X \geq 10$ mG or $Gy\_A(n) > 0.1$ dps (step S15; YES), data corresponding to "stopping (unstable)" is generated. Further, in step S17, in a case where $\Delta X_{1s} < 10$ mG or $Gy\_A(n) \leq 0.1$ dps (step S15; NO), when 10 mG$>\Delta X_{1s}>5$ mg and $Gy\_A(n) \leq 0.1$ dps, data corresponding to "running" is generated (step S17; YES).

According to the first embodiment and its modified example as described above, it is possible to identify a vehicle state with higher accuracy. Further, it is possible to perform optical axis control according to the identified vehicle state.

In detail, since inclination of the vehicle is small while running at extremely low speed, it is considered difficult to detect changes in the angular velocity when only the angular velocity detected by the gyro sensor is used. Further, when only the acceleration detected by the acceleration sensor is used, especially if an attempt is made to shorten the detection time, it is considered difficult to distinguish between a change in vehicle attitude due to load and a change in vehicle attitude due to acceleration/deceleration. Further, when using the open/closed state of doors, etc., even if the vehicle stopped state can be determined, other states cannot be separated, and it is not possible to adapt when a signal indicating the open/closed state cannot be obtained, and further, it is considered difficult to adapt to vehicles with a loading platform. According to the first embodiment, etc., these inconveniences can be solved. The same applies to the second embodiment and other modified examples to be described later.

Here, note that the numerical values used as criteria for case classification in the first embodiment and its modified example are merely examples and are not limited thereto, and it is desirable to set appropriate numerical values through experiments, etc. according to the vehicle type and other various conditions. For example, with regard to $\Delta X_{1s}$, a numerical example of 10 mG>$\Delta X_{1s}$>5 mG has been given, but the lower limit of 5 mG may be set appropriately considering the noise of the acceleration sensor 12 itself. Further, the upper limit of 10 mG may be set appropriately considering the vibration caused by the loading of luggage, etc. Further, Gx_A(n) and Gy_A(n) may be appropriately set to values lower than the values corresponding to vibrations caused by the loading of luggage, etc.

Second Embodiment

In the first embodiment as described above, the amount of change of the angular velocity of the roll angle (or pitch angle) and the X-axis acceleration are compared with predetermined reference values to determine the vehicle state. It is also possible to determine the vehicle state using unique parameters as described below. Here, note that the configuration of the vehicle lamp system is essentially the same to that of the first embodiment, and since the difference is only the content of information processing by the running/stopping detection unit 22, in the following, only the different point will be described in detail.

Figure 7:
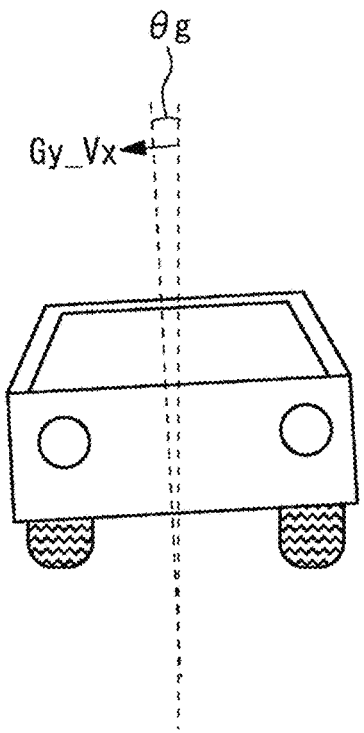
FIG. 7 is a diagram for explaining vector quantities used for unique parameters.

FIG. 7 is a diagram for explaining vector quantities used for unique parameters. Here, the vehicle is schematically shown as viewed from the front side. As shown in the figure, if the angular velocity per unit time of a roll angle θg where the roll angle is the angle around the vehicle's X axis (vehicle front-rear axis), the sinusoidal vector Gy_Vx(n) of the roll angle can be expressed as as follows.

$Gy\_Vx(n)=-9.8\sin(\theta g)$

Further, the X-axis acceleration obtained from the acceleration sensor 12 is assumed to be GA_x, its current value is expressed as GA_x(n), and the previous value is expressed as GA_x(n−1).

Here, "n" is a unit time, and indicates that calculation is performed every 100 ms, for example. For instance, for Gy_Vx(n), Gy_Vx(n−1) is a value obtained 100 ms ago. Similarly, for GA_x(n), GA_x(n−1) is a value obtained 100 ms ago.

Here, state monitoring parameter Sc is defined as follows.

$Sc=(Gy\_Vx(n)-Gy\_Vx(n-1))/(GA\_x(n)-GA\_x(n-1))$

The state monitoring parameter Sc indicates the ratio between the amount of change of the sinusoidal vector of the roll angle and the amount of change of the X-axis acceleration. The state monitoring parameter is a parameter that more strongly reflects the characteristics of the X-axis acceleration and the roll angular velocity as shown in FIG. 4. Specifically, when the vehicle's attitude angle changes while the vehicle is stopped, the amount of change of the roll angular velocity and the amount of change of the X-axis acceleration change in the same way, while, when the vehicle's attitude angle does not change, there is no change in both the amount of change of the roll angular velocity and the amount of change of the X-axis acceleration. Further, since the roll angular velocity does not substantially change during low-speed running, even if the sin direction vector is calculated, its value does not substantially change. On the contrary, the X-axis acceleration changes even when the vehicle is running at low speed. This is because even when the vehicle is running at a low speed, it cannot maintain its low speed by inertia alone, therefore some acceleration or deceleration will occur, and the vehicle will almost never run at a constant speed.

From the above description, when the state monitoring parameter Sc is defined as above, since the numerator includes the roll angular velocity and the denominator includes the X-axis acceleration, Sc becomes a very small value while the vehicle is running at low speed. On the other hand, when the vehicle is at a stop, since the roll angular velocity and the X-axis acceleration similarly change, Sc becomes a relatively large value. That is, it can be used as a parameter that clearly indicates the characteristics of the vehicle state. Further, since it is possible to obtain the state monitoring parameter at relatively short intervals, for example, every 100 ms, the time required to identify the vehicle state can be further shortened.

Figure 8:
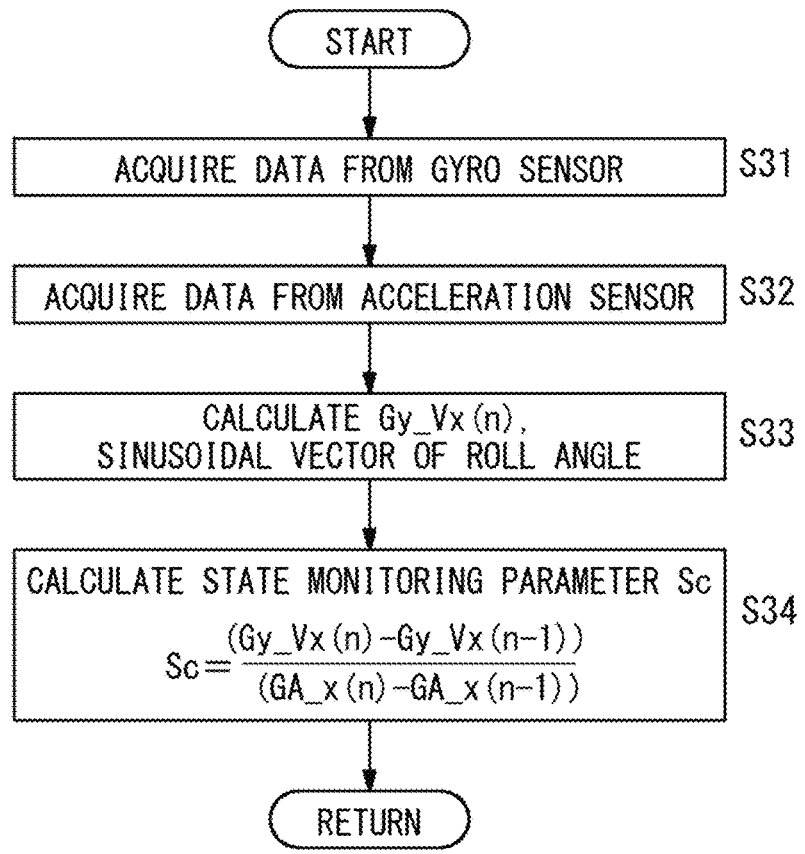
FIG. 8 is a flowchart illustrating a processing procedure for generating parameters used to identify a vehicle state based on data output from each of a gyro sensor and an acceleration sensor.

FIG. 8 is a flowchart illustrating a processing procedure for generating parameters used to identify the vehicle state based on data output from each of the gyro sensor and the acceleration sensor. These processes are repeatedly executed by the running/stopping detection unit 22 of the controller 10. Here, in any operation procedure, it is possible to change the processing order as appropriate as long as it does not cause contradiction or inconsistency in the results of information processing, and other processing not described here may be added, and such embodiments are also not excluded.

Specifically, the running/stopping detection unit 22 acquires roll angular velocity data from the gyro sensor 11 (step S31), and acquires X-axis acceleration data from the acceleration sensor 12 (step S32). For example, in the present embodiment, roll angular velocity data and X-axis acceleration data are each acquired every 100 ms.

Using each acquired data, the running/stopping detection unit 22 calculates the sinusoidal vector Gy_Vx(n) of the roll angle (step S33). The running/stopping detection unit 22 then calculates the state monitoring parameter Sc (step S34).

Then, the running/stopping detection unit 22 temporarily stores GA_x(n) and Gy_Vx(n) in the memory. GA_x(n) and Gy_Vx(n) stored here are used as Gy_Vx(n−1) in the next calculation. Here, note that if the previous values GA_x(n) and Gy_Vx(n) do not exist at the time of the first calculation, the running/stopping detection unit 22 preferably performs the calculations in steps S34 and S35 using a commonly used method such as using a predetermined initial value.

Figure 9:
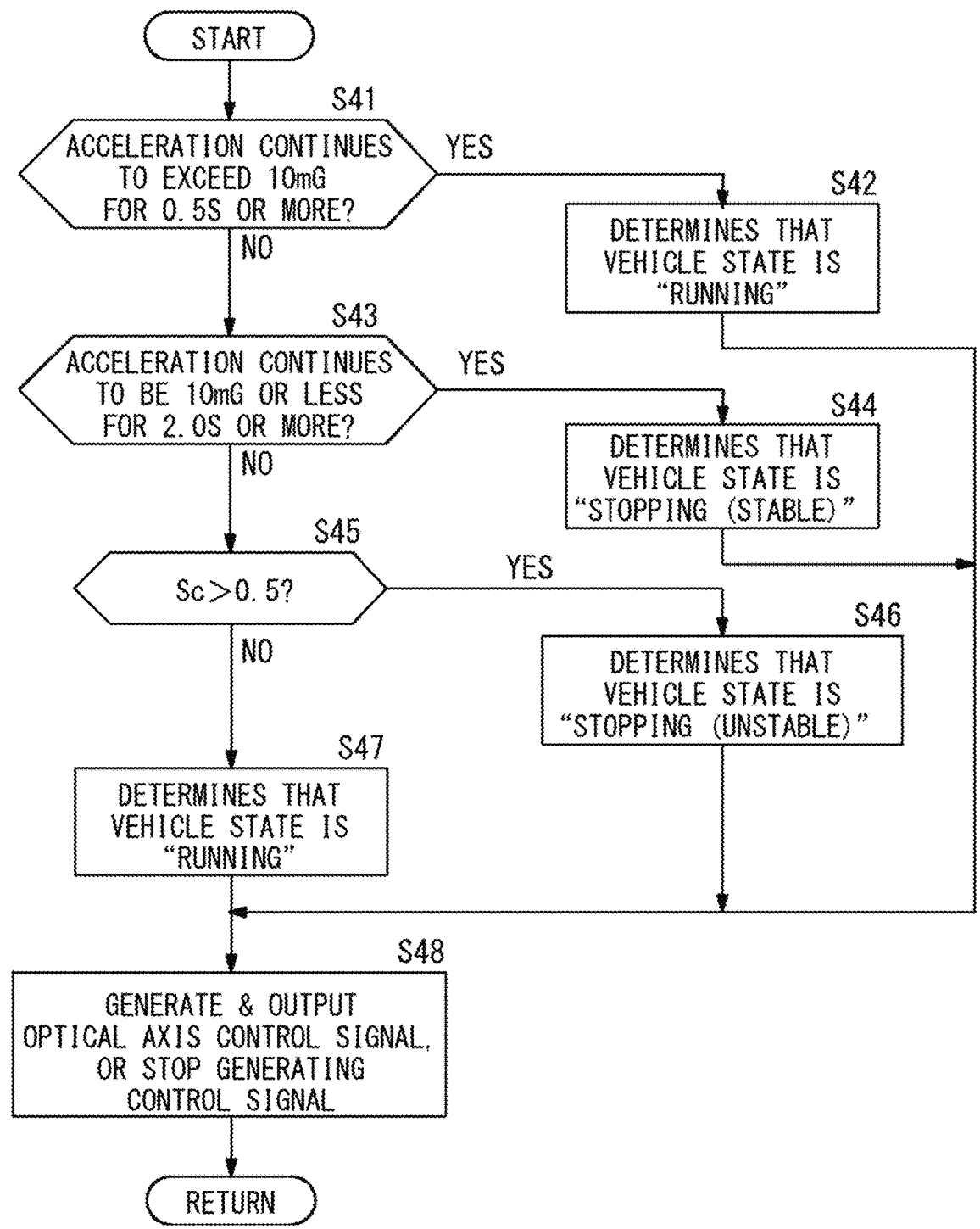
FIG. 9 is a flowchart illustrating a processing procedure for identifying the vehicle state by the controller and controlling the optical axis using it.

FIG. 9 is a flowchart illustrating the processing procedure for identifying the vehicle state by the controller and controlling the optical axis using it. The processing procedure shown here is repeatedly executed, for example, every 100 ms. Here, in any operation procedure, it is possible to change the processing order as appropriate as long as it does not cause contradiction or inconsistency in the results of information processing, and other processing not described here may be added, and such embodiments are also not excluded.

Since steps S41 to S44 are the same processes as steps S11 to S14 in the flowchart of the first embodiment described above, description thereof will be omitted here.

When the above-described state monitoring parameter Sc is greater than 0.5 (step S45; YES), the running/stopping detection unit 22 generates data corresponding to "stopping (unstable)". In this case, the vehicle state output unit 23 determines that the vehicle state is "stopping (unstable)" and outputs data indicating this state to the optical axis control unit 24 (step S46).

Further, when the above-described state monitoring parameter Sc is 0.5 or less (step S45; NO), the running/stopping detection unit 22 generates data corresponding to "running". In this case, the vehicle state output unit 23 determines that the vehicle state is "running" and outputs data indicating this state to the optical axis control unit 24 (step S47).

When the vehicle state is output from the vehicle state output unit 23, the optical axis control unit 24 determines an attitude angle of the vehicle according to the vehicle state, and according to the attitude angle, generates a control signal to control the optical axis of the irradiation light of each lamp unit 30L, 30R, then outputs the control signal to each lamp unit 30L, 30R, or stops outputting the control signal (step S48).

Here, note that in the embodiment described above, the roll angle can be replaced with a pitch angle. Specifically, first, the process in step S33 of FIG. 8 described above is replaced with calculation of the sinusoidal vector of the pitch angle, expressed as Gy_Vy (n). Gy_Vy (n) is expressed as follows. Here, note that θg here is a pitch angle which is an angle around the Y axis (vehicle's left-right direction axis) of the vehicle.

$$Gy\_Vy(n) = -9.8 \sin(\theta g)$$

Further, in step S34 of FIG. 8, the state monitoring parameter Sc is defined as follows.

$$Sc = (Gy\_Vy(n) - Gy\_Vy(n-1))/(GA\_x(n) - GA\_x(n-1))$$

Further, in step S47 of FIG. 9, for example, when Sc is greater than 1.0, the process proceeds to step S46, and when Sc is 1.0 or less, the process proceeds to step S47.

According to the second embodiment and its modified example as described above, it is possible to identify a vehicle state with higher accuracy. Further, it is possible to perform optical axis control according to the identified vehicle state.

Here, note that the numerical values used as criteria for case classification in the second embodiment and its modified example are merely examples and are not limited thereto, and it is desirable to set appropriate numerical values through experiments, etc. according to the vehicle type and other various conditions.

Other Modified Examples

Note that the present disclosure is not limited to the contents of each embodiment described above, and can be implemented with various modifications within the scope of the gist of the present disclosure. For example, although the above-described embodiments have been described using a four-wheeled vehicle as an example, the content of the present disclosure can be applied to two-wheeled vehicles, three-wheeled vehicles, or other various vehicles. Since four-wheeled vehicles tend to tilt in the left-right direction when passengers get on and off or when loading luggage, it is considered that an embodiment using roll angular velocity or its modified embodiment thereof would be more suitable. On the other hand, for example, in a two-wheeled vehicle, since the vehicle tends to tilt in the longitudinal (front-rear) direction, it is considered that the embodiment using pitch angular velocity or its modified embodiment thereof is more preferably used in many situations. However, since it depends on the situation of the vehicle, there is no particular limitation as to which embodiment is to be applied.

Further, in the above-described embodiments, a case where an apparatus for identifying vehicle state according to the present disclosure and its method used to adjust the optical axis of a vehicle lamp has been exemplified, but the scope of application of the apparatus and method is not limited thereto. For example, the present disclosure may be applied to a car navigation system that performs control according to the vehicle state, or may be applied to a situation where automatic driving control of a vehicle is performed.

REFERENCE SIGNS LIST

10: Controller
11: Gyro sensor
12: Acceleration sensor
21: Vibration detection unit
22: Running/stopping detection unit
23: Vehicle state output unit
24: Optical axis control unit
30L, 30R: Lamp unit

The invention claimed is:

1. An apparatus that identifies a state of a vehicle comprising a controller connected to an angular velocity sensor and an acceleration sensor,
    wherein the controller,
    acquires acceleration per unit time along an axis corresponding to a longitudinal direction of the vehicle from the acceleration sensor, determines an amount of change of the acceleration over a certain period of time,
    acquires angular velocity per unit time around either a roll axis or a pitch axis of the vehicle from the angular velocity sensor, determines an amount of change of the angular velocity during the certain period of time,
    identifies the vehicle as being in a first state when the amount of change of the acceleration is greater than or equal to a first threshold value and the amount of change of the angular velocity is greater than a second threshold value, and identifies the vehicle as being in a second state which is different from the first state when the amount of change of the acceleration is less than the first threshold value and the amount of change of the angular velocity is less than or equal to the second threshold value, and outputs the identified result,
    wherein the first state corresponds to a state in which the vehicle is running and the second state corresponds to a state in which the vehicle is stopped and has vibration.

2. An apparatus that controls an optical axis of a headlamp installed in a vehicle,
    wherein a first process is selected when the identified result of the vehicle state obtained by the apparatus that identifies the state of the vehicle according to claim 1 is the first state, a second process which is different from the first process is selected when the identified result is the second state, determines an attitude angle of the vehicle, and outputs a control signal for controlling the optical axis of the headlamp using the attitude angle.

3. A vehicle lamp system comprising:
the apparatus that controls the optical axis according to claim 2 and
a headlamp whose optical axis can be variably set based on the control signal output from the apparatus that controls the optical axis.

4. The apparatus that identifies the state of a vehicle according to claim 1,
wherein the controller identifies the vehicle as being in the second state when the amount of change of the acceleration is less than the first threshold value and greater than a third threshold value and the amount of change of the angular velocity is less than or equal to the second threshold value.

5. The apparatus that identifies the state of a vehicle according to claim 1,
wherein the amount of change of the acceleration is obtained by calculating the difference between a current value and a previous value of the acceleration for each unit time and integrating the difference for the certain period of time, and
wherein the amount of change of the angular velocity is obtained by calculating the difference between a current value of the angular velocity and a previous value for each unit time and integrating the difference for the certain period of time.

6. An apparatus that identifies a state of a vehicle comprising a controller connected to an angular velocity sensor and an acceleration sensor,
wherein the controller,
acquires an acceleration per unit time along an axis corresponding to a longitudinal direction of the vehicle from the acceleration sensor, determines a first difference which is the difference between a current value and a previous value of the acceleration,
acquires an angular velocity per unit time around either the roll axis or the pitch axis of the vehicle from the angular velocity sensor, determines a second difference which is the difference between a current value and a previous value of a sinusoidal vector of the roll axis or the pitch axis based on the angular velocity, and
identifies the vehicle as being in a first state when a state monitoring parameter obtained based on a ratio of the first difference and the second difference is equal to or greater than a predetermined threshold, and identifies the vehicle as being in a second state which is different from the first state when the state monitoring parameter is less than the predetermined threshold, and outputs the identified result,
wherein the first state corresponds to a state in which the vehicle is running and the second state corresponds to a state in which the vehicle is stopped and has vibration.

7. The apparatus that identifies the state of a vehicle according to claim 6,
wherein the sinusoidal vector is expressed as $-9.8 \times \sin(\theta g)$, and is obtained by substituting the angular velocity per unit time for the $\theta g$.

8. A method that identifies a state of a vehicle performed by a controller connected to an angular velocity sensor and an acceleration sensor, the method comprising:
to acquire an acceleration per unit time along an axis corresponding to a longitudinal direction of the vehicle from the acceleration sensor, determines an amount of change of the acceleration over a certain period of time,
to acquire an angular velocity per the unit time around either a roll axis or a pitch axis of the vehicle from the angular velocity sensor, determines an amount of change of the angular velocity during the certain period of time, and
to identify the vehicle as being in a first state when the amount of change of the acceleration is greater than or equal to a first threshold value and the amount of change of the angular velocity is greater than a second threshold value, and identifies the vehicle as being in a second state which is different from the first state when the amount of change of the acceleration is less than the first threshold value and the amount of change of the angular velocity is less than or equal to the second threshold value, and outputs the identified result,
wherein the first state corresponds to a state in which the vehicle is running and the second state corresponds to a state in which the vehicle is stopped and has vibration.

9. A method to control an optical axis of a headlamp installed in a vehicle,
wherein a first process is selected when the identified result of the vehicle state obtained by the method that identifies the state of a vehicle according to claim 8 is the first state, a second process which is different from the first process is selected when the identified result is the second state, determines an attitude angle of the vehicle, and outputs a control signal for controlling the optical axis of the headlamp using the attitude angle.

10. A method that identifies a state of a vehicle performed by a controller connected to an angular velocity sensor and an acceleration sensor, the method comprising:
to acquire an acceleration per unit time along an axis corresponding to a longitudinal direction of the vehicle from the acceleration sensor, determines a first difference which is the difference between a current value and a previous value of the acceleration,
to acquire an angular velocity per unit time around either the roll axis or the pitch axis of the vehicle from the angular velocity sensor, determines a second difference which is the difference between a current value and a previous value of a sinusoidal vector of the roll axis or the pitch axis based on the angular velocity, and
to identify the vehicle as being in a first state when a state monitoring parameter obtained based on a ratio of the first difference and the second difference is equal to or greater than a predetermined threshold, and to identify the vehicle as being in a second state which is different from the first state when the state monitoring parameter is less than the predetermined threshold, and outputs the identified result,
wherein the first state corresponds to a state in which the vehicle is running and the second state corresponds to a state in which the vehicle is stopped and has vibration.

* * * * *